United States Patent
Lee et al.

(10) Patent No.: US 10,515,385 B2
(45) Date of Patent: Dec. 24, 2019

(54) STAMPER, TERMINAL, AND OPERATION METHOD THEREOF

(71) Applicant: SK TELECOM CO., LTD., Seoul (KR)

(72) Inventors: Sun Ho Lee, Seoul (KR); Soo Woong Woo, Seoul (KR); Jae Hun Choi, Seoul (KR); Yang Hoon Shin, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 321 days.

(21) Appl. No.: 15/349,728

(22) Filed: Nov. 11, 2016

(65) Prior Publication Data

US 2017/0061464 A1 Mar. 2, 2017

Related U.S. Application Data

(63) Continuation of application No. PCT/KR2015/004576, filed on May 7, 2015.

(30) Foreign Application Priority Data

Aug. 4, 2014 (KR) ........................ 10-2014-0099774

(51) Int. Cl.
   *G06Q 30/02* (2012.01)
   *H04L 29/06* (2006.01)
(52) U.S. Cl.
   CPC ..... *G06Q 30/0226* (2013.01); *H04L 63/0853* (2013.01)
(58) Field of Classification Search
   CPC ..... G06F 21/30; G06F 3/044; H04L 63/0853; H04W 12/06; H04W 48/16; H04W 72/04; H04W 52/28; H04W 72/12; H04W 72/1284; G06Q 30/02; G06Q 30/0226; H04J 3/24; H04B 1/00; H04B 17/24
   USPC ............. 726/9; 370/329, 334, 349; 455/561, 455/115.3, 517
   See application file for complete search history.

(56) References Cited

U.S. PATENT DOCUMENTS

| 8,411,644 | B2 * | 4/2013 | Jeon ...................... H04L 47/826 370/334 |
| 9,204,376 | B2 * | 12/2015 | Ullah ........................ G01S 5/02 |
| 9,335,872 | B2 * | 5/2016 | Ng ..................... G06F 3/03545 |
| 9,572,179 | B2 * | 2/2017 | Das ................... H04W 72/1284 |

(Continued)

FOREIGN PATENT DOCUMENTS

| JP | 2012-118637 A | 6/2012 |
| KR | 10-2013-0026610 A | 3/2013 |
| KR | 10-2013-0081681 A | 7/2013 |

(Continued)

OTHER PUBLICATIONS

International Search Report dated Jul. 16, 2015 corresponding to International Application No. PCT/KR2015/004576.

*Primary Examiner* — Thanhnga B Truong
(74) *Attorney, Agent, or Firm* — Hauptman Ham, LLP

(57) ABSTRACT

Disclosed are a stamper, a terminal and an operation method thereof. The stamper includes: a transmission part configured to transmit a beacon signal related to stamp saving to a terminal; a contact tip contacting the terminal; and a control part configured to include a bit value in the beacon signal, wherein the bit value is generated to indicate contact of the contact tip with the terminal.

4 Claims, 10 Drawing Sheets

(56) References Cited

U.S. PATENT DOCUMENTS

2003/0186724 A1* 10/2003 Tsutsumi ............... H04L 47/10
                                                    455/561
2015/0351084 A1* 12/2015 Werb ...................... H04W 4/70
                                                    370/329

FOREIGN PATENT DOCUMENTS

KR           10-1281998 B1    7/2013
KR      10-2013-0100834 A     9/2013

* cited by examiner

Fig. 4
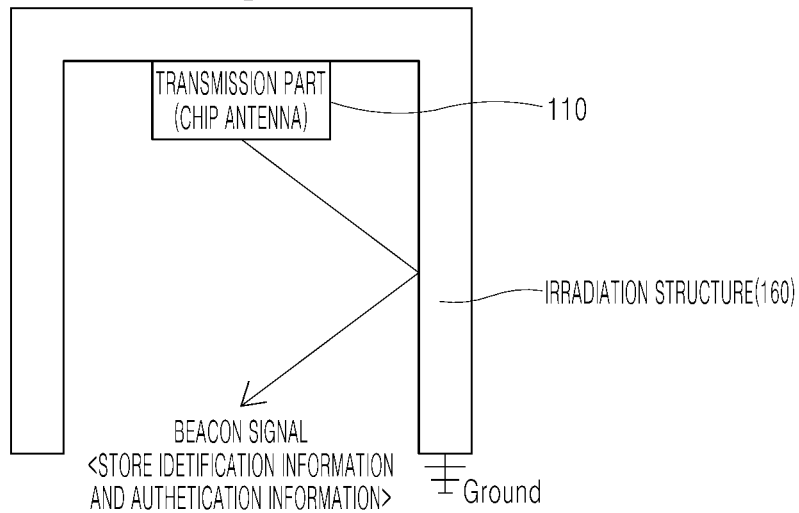
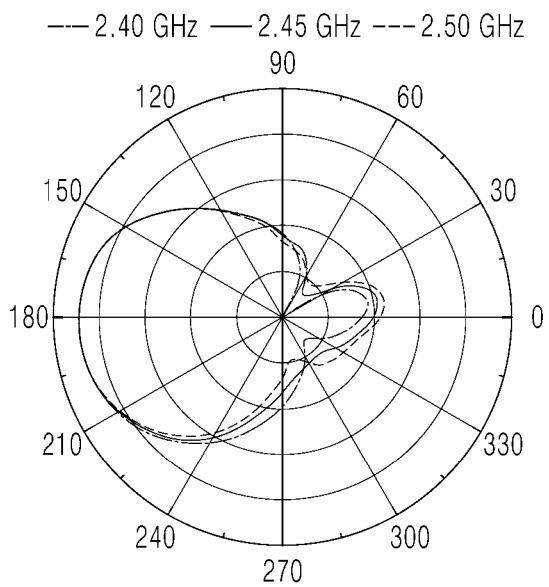
<DIRECTIONAL BEAM PATTERN>
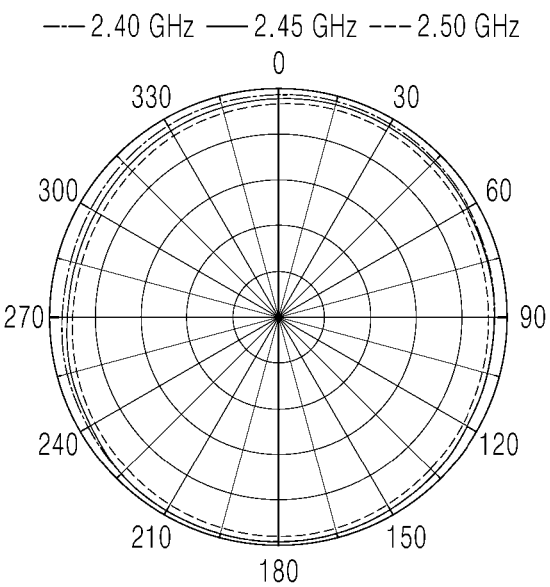
<NON-DIRECTIONAL BEAM PATTERN>

(a)

(b)

(c)

STAMPER, TERMINAL, AND OPERATION METHOD THEREOF

CROSS-REFERENCE TO RELATED APPLICATIONS

The present application is a continuation of International Patent Application No. PCT/KR2015/004576, filed May 7, 2015, which is based upon and claims the benefit of priority to Korean Patent Application No. 10-2014-0099774, filed on Aug. 4, 2014. The disclosure of the above-listed applications are hereby incorporated by reference herein in their entirety.

TECHNICAL FIELD

This invention relates to a stamp service and more particularly, to a technique for saving stamps related to a store for a user by utilizing an electronic stamp and an application installed in a terminal.

BACKGROUND ART

Some store owners often offer a stamp service as a part of loyalty program for encouraging consumers to have more visits to and place more orders in their franchisees.

A stamp service refers to a service in which the number of times of visits of a user to a store or the number of times of orders by the user in the store is accumulatively marked with an ink stamp on a saving card in paper form and monetary or material benefits are offered to the user based on a result of the accumulation.

By the way, in order to save the number of times of visits to the store or the number of times of orders in the store with the ink stamp, the user who possessed a saving card given out by the store has to submit the saving card to the store. However, the paper saving card is inconvenient for the user and has a risk of missing.

Therefore, in order to overcome the above problems of the conventional stamp service, there is a need for replacements for the existing paper saving card and ink stamp.

DISCLOSURE

Technical Problem

In view of the above circumstances, it is therefore an object of the present invention to provide a technique for saving stamps related to a store for a user by utilizing an electronic stamp and an application installed in a terminal, which is capable of achieving stamp saving by only stamp contact made on a terminal screen.

It is another object of the present invention to provide a technique for preventing a beacon signal irradiated from a stamper from being received in terminals other than a terminal in which stamp saving is to be performed, by limiting an irradiation angle of the beacon signal.

Technical Solution

To achieve the above object, according to a first aspect, there is provided a stamper including: a transmission part configured to transmit a beacon signal including store identification information, authentication information and a bit related to stamp saving to a terminal; a contact tip configured to contact the terminal screen; and a control part configured to control for transmission of the beacon signal, wherein the control part controls the bit related to stamp saving to have a particular bit value when the contact tip contacts the terminal screen and controls to transmit the beacon signal including the bit related to stamp saving controlled to have the particular bit value to the terminal, thereby the store identification information and authentication information being able to transmitted to a server for the stamp saving when the bit related to stamp saving is controlled to have the particular bit value.

In one embodiment, the stamper may further include a bit generator configured to be switched from an Off state to an On state when the contact tip contacts the terminal screen.

In one embodiment, the bit generator sets a bit value of the bit related to stamp saving to the particular bit value when the bit generator is switched from an Off state to an On state.

In one embodiment, the bit generator is switched from the Off state to the On state by the contact tip moved to the inside of the stamper and contacted with the bit generator when the contact tip contacts the terminal screen, and wherein the bit generator is switched from the On state to the Off state by the contact tip moved to the outside of the stamper and released from the bit generator when the contact of the contact tip with the terminal screen is released.

In one embodiment, the stamper may further includes an irradiation structure which is a shielding structure with one side opened and is formed to surround the transmission part in such a manner that the beacon signal irradiated from the transmission part is transmitted to the terminal through the opened one side at a preset irradiation angle.

According to a second aspect, there is provided a terminal including: a receiving part configured to receive a beacon signal including store identification information, authentication information and a bit related to stamp saving from a stamper; and a transmitting part configured to transmit the store identification information and the authentication information to a server for the stamp saving when it is identified that the stamper contacts the terminal screen, wherein it is identified that the stamper contacts the terminal screen when the bit related to stamp saving transmitted from the stamper has a particular bit value, the bit related to stamp saving being sets to have a particular value when the stamper contacts the terminal screen.

In one embodiment, the terminal may further include a standby processing part configured to switch a designated standby mode to an active mode where stamp saving being able to be performed.

In one embodiment, the standby processing part may switch the designated standby mode to the active mode when it is identified the particular value bit related to stamp saving is transmitted from the stamper According to a third aspect, there is provided a method for operating a terminal comprising receiving a beacon signal including store identification information, authentication information and a bit related to stamp saving from a stamper; and transmitting the store identification information and the authentication information to a server for the stamp saving when it is identified that the stamper contacts the terminal screen, wherein it is identified that the stamper contacts the terminal screen when the bit related to stamp saving transmitted from the stamper has a particular bit value, the bit related to stamp saving being sets to have a particular value when the stamper contacts the terminal screen.

In one embodiment, the a method for operating a terminal may further comprises switching a designated standby mode to an active mode where stamp saving being able to be performed In one embodiment, the a method for operating a terminal may further comprises switching the designated standby mode to the active mode when it is identified the particular value bit related to stamp saving is transmitted from the stamper.

Advantageous Effects

As described above, according to a stamper, terminal and method thereof according to one embodiment of the present invention, it is possible to provide a technique for saving stamps related to a store for a user by utilizing an electronic stamp and an application installed in a terminal, which is capable of achieving stamp saving by only stamp contact made on a terminal screen, thereby preventing a malfunction that stamps are saved by contact by a finger or other tool.

In addition, according to a stamper, terminal and method thereof according to one embodiment of the present invention, it is possible to provide a technique for preventing a beacon signal irradiated from a stamper from being received in terminals other than a terminal in which stamp saving is to be performed, by limiting an irradiation angle of the beacon signal, thereby preventing malicious and illegal use of stamps.

DESCRIPTION OF DRAWINGS

FIGS. 4 and 5 are schematic views for explaining a hardware structure of the stamper according to one embodiment of the present invention.

MODE FOR INVENTION

Hereinafter, an exemplary embodiment of the present invention will be described in detail with reference to the accompanying drawings.

Figure 1:
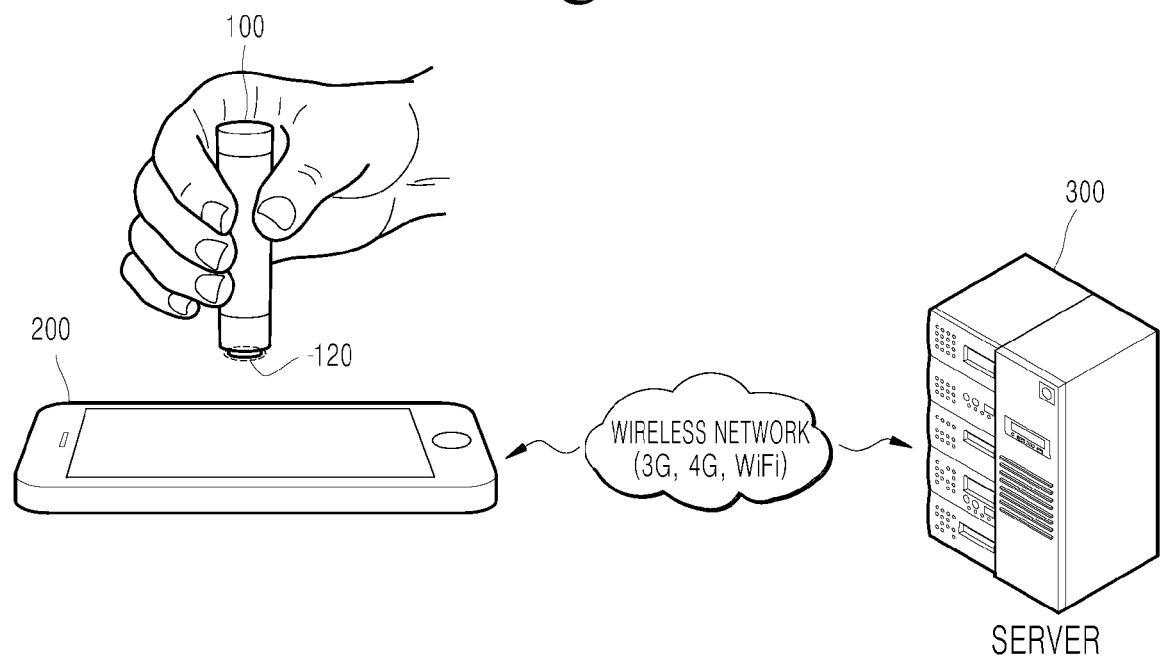
FIG. 1 is a schematic view illustrating the configuration of a stamp service system according to one embodiment of the present invention.

FIG. 1 is a schematic view illustrating the configuration of a stamp service system according to one embodiment of the present invention.

Referring to FIG. 1, a stamp service system according to one embodiment of the present invention includes a terminal 200 for managing a saving card, a stamper 100 for inputting an electronic stamp to the terminal 200, and a server 300 for managing authentication on stamp saving and the current situation on stamp saving for each store.

The stamper 100 refers to a device for facilitating stamp saving by inputting an electronic stamp to the terminal 200.

Apart from the input of the electronic stamp, the stamper 100 may transmit a Bluetooth-based beacon signal so as to receive store-related information (e.g., store identification information) in the terminal 200, thereby allowing the terminal 200 to perform stamp saving related to the store upon receiving the beacon signal.

The Bluetooth used herein may be, e.g., a BLE (Bluetooth Low Energy) method which is a low energy method in Bluetooth v4.0.

The terminal 200 is a device for managing a saving card with saved stamps using an application. In contact with the stamper 100, the terminal 200 performs the stamp saving based on the beacon signal transmitted from the stamper 100.

The terminal 200 may include, but is not limited to, a smartphone, a tablet PC, a PDA, or any devices capable of executing an application related to a stamp service and supporting Bluetooth.

The server 300 is a service server which performs the stamp saving required by the terminal 200. The server 300 can perform and manage the stamp saving related to a store for a user only if a predetermined authentication process required for the stamp saving has been completed.

In one embodiment of the present invention, the stamp saving may be achieved by the electronic stamp being input to the terminal 200 in an electrostatic touch method when the stamper 100 is in contact with a screen of the terminal 200.

However, the electrostatic touch method has a demerit that it is difficult to distinguish between contact by the stamper 100 on the screen of the terminal 200 and contact by a finger or other tools.

This may be attributed to the property of the electrostatic touch method that it can basically recognize only a change in charges on a display panel surface but cannot identify a tool causing the change in charges.

Such a limit of the electrostatic touch method means that it is not possible to distinguish between contact by the stamper 100 on the screen of the terminal 200 and contact by a finger or other tools such as a separate electrostatic touch pen or the like, which may cause a malfunction that stamp saving is performed even though no actual contact by the stamper 100 is made.

In one embodiment of the present invention, the stamper 100 transmits information related to a store to the terminal 200 using the beacon signal irradiated from the stamper 100.

In typical, the beacon signal irradiated from the stamper 100 has a non-directional beam pattern in which an irradiation angle of the beacon signal is not limited.

That the beacon signal irradiated from the stamper 100 has the non-directional beam pattern means that there is a high possibility that the beacon signal irradiated from the stamper 100 is received in other terminals, in addition to the terminal 200 in which the stamp saving is substantially to be performed.

In the end, if the beacon signal is received in other terminals, in addition to the terminal 200 in which the stamp saving is substantially to be performed, there may be a possibility of malicious use of stamps in the other terminals. Therefore, there is a need for measures against this malicious use.

One embodiment of the present invention suggests a technique for performing proper stamp saving by only contact by the stamper 100 while preventing malicious and illegal use of stamps due to the non-directional beam pattern of the beacon signal. Hereinafter, the internal configuration of a stamp service system for implementing this technique will be described in detail.

The stamper 100 performs the function to transmit a beacon signal.

In more detail, the stamper 100 uses the beacon signal aimed at a terminal 200 located in a store to transmit store identification information and authentication information to the terminal 200.

At this time, the stamper 100 irradiates the beacon signal having a directional beam pattern in which an irradiation angle of the beacon signal is limited to be smaller than a preset irradiation angle.

Such limitation of the irradiation angle of the beacon signal is to minimize a possibility that the beacon signal is received in terminals other than the terminal 200 in which stamping saving is actually to be performed.

In addition, the stamper 100 performs the function to cause stamp saving to be achieved in the terminal 200.

In more detail, the stamper 100 causes the stamp saving to be achieved in the terminal 200 by transmitting the store identification information and authentication information included in the beacon signal to the server 300 only when a contact tip 120 contacts the screen of the terminal 200 which is receiving the beacon signal.

At this time, when the contact tip 120 contacts the screen of the terminal 200, the stamper 100 sets a bit value of a specified bit (hereinafter referred to as a 'tact bit') designated in association with the stamp saving, among the entire bits of the beacon signal, to '1' for transmission. The stamp saving is achieved in the terminal 200 only when the beacon signal whose bit value of the tact bit is set to '1' is received.

On the other hand, when the contact tip 120 is in no contact with the screen of the terminal 200, the stamper 100 sets the bit value of the tact bit of the beacon signal to '0' for transmission. Thus, no operation related to the stamp saving is achieved in the terminal 200 which receives the beacon signal whose bit value of the tact bit is set to '0.'

The terminal 200 performs the function to receive the beacon signal.

In more detail, the terminal 200 receives the store identification information and authentication information transmitted using the beacon signal from the stamper 100 in the store.

At this time, since the beacon signal irradiated from the stamper 100 has a directional beam pattern in which an irradiation angle of the beacon signal is greatly limited, the beacon signal irradiated from the stamper 100 can be received only in a limited range.

Such receiving the beacon signal irradiated from the stamper 100 only in the limited range is to minimize a possibility that the beacon signal may be received in other terminals in which stamp saving is not substantially to be performed.

In addition, the terminal 200 performs the function to achieve the stamp saving.

In more detail, only when it is confirmed that the contact tip 120 in the stamper 100 is in contact with the screen of the stamper 100, the store identification information and authentication information included in the beacon signal are transmitted to the server 300 in which the stamp saving related to the store for a user is achieved.

At this time, when the bit value of the tact bit of the beacon signal received from the stamper 100 is '1,' the terminal 200 confirms that contact recognized on the screen of the terminal 200 is made by the contact tip 120 of the stamper 100, in which case the store identification information and authentication information included in the beacon signal are transmitted to the server 300 in which the stamp saving related to the store for a user is achieved.

On the other hand, when the bit value of the tact bit of the beacon signal received from the stamper 100 is '0,' the terminal 200 assumes that the contact recognized on the screen of the terminal 200 is made not by the contact tip 120 in the stamper 100 but by a finger or other tools, and accordingly performs no operation related to the stamp saving.

In addition, the terminal 200 checks whether or not identification information of a saving card being executed in an application matches the store identification information received from the stamper 100. Thereafter, only when it is checked that both match with each other, the terminal 200 transmits the store identification information and authentication information to the server 300.

As described previously, the operations in the terminal 200 in which the stamp saving is performed based on the beacon signal transmitted from the stamper 100 are performed by an application installed in the terminal 200.

This is subject to the conditions that the application is under execution in the terminal, that is, the application is active in the foreground of the terminal 200. In one embodiment of the present invention, the application may be executed either in the foreground or in the background of the terminal 200.

The phrase "the application is executed in the background of the terminal 200" used herein means that the application can be also executed in a state where the terminal 200 enters a designated standby mode rather than an active mode where the stamp saving can be properly achieved.

For reference, the standby mode of the terminal 200 may include, e.g., a case where a light (e.g., LED) of the terminal screen is off, a case where the terminal screen is locked, and a case where the terminal screen is a home screen (typical standby screen).

In the terminal 200 in the standby mode, the beacon signal transmitted from the stamper 100 can be only received and contact of the stamper 100 on the screen of the terminal 200 cannot be recognized.

On the contrary, the active mode of the terminal 200 means that the application is being executed in the foreground to facilitate both of reception of the beacon signal transmitted from the stamper 100 and recognition of contact of the stamper 100 on the screen of the terminal 200.

In this way, in one embodiment of the present invention, even when the terminal 200 enters the standby mode, the application installed in the terminal 200 can perform a series of operations related to the stamp saving, as will be described in more detail below.

That is, even when entering the standby mode, the terminal 200 can receive the beacon signal transmitted from the stamper 100, as in the active mode where the substantial stamp saving can be properly performed.

Figure 2:
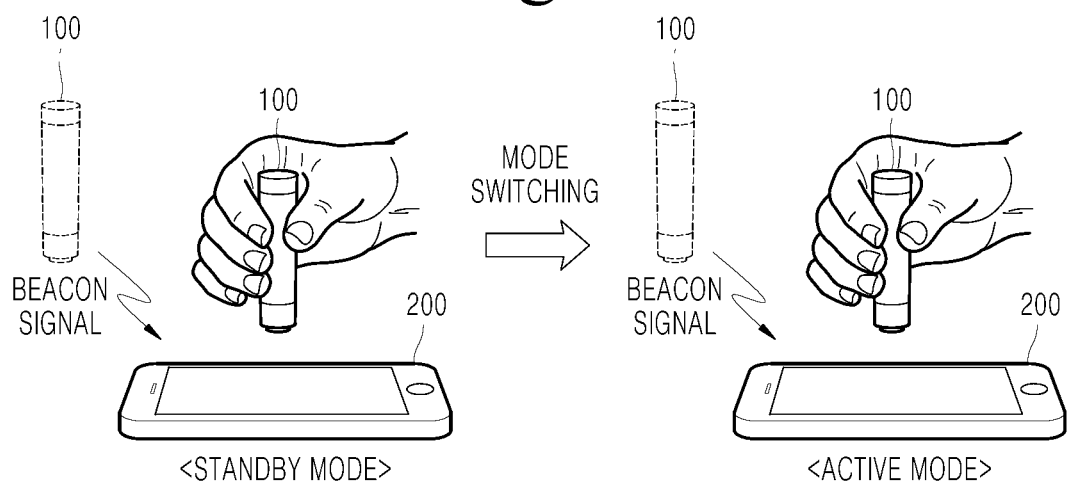
FIG. 2 is a view for explaining mode switching in a terminal according to one embodiment of the present invention.

Accordingly, when the terminal 200 receives the beacon signal from the stamper 100 under a state where the terminal 200 enters the standby mode as shown in FIG. 2, if it is confirmed that the bit value of the tact bit included in the received beacon signal is '1,' the terminal 200 recognizes that the stamper 100 is in contact with the screen, and switches the current standby mode to the active mode where the stamp saving can be achieved.

That is, although the terminal 200 cannot directly recognize the contact of the stamper 100 on the screen in the standby mode, if it is confirmed that the bit value of the tact bit included in the beacon signal is set to '1,' the terminal 200 can indirectly confirm that the stamper 100 is in contact with the screen.

Of course, when the bit value of the tact bit included in the beacon signal received from the stamper 100 is '0,' the terminal 200 lasts the standby mode.

The phrase "the terminal 200 is switched from the standby mode to the active mode" used herein means that the installed application is executed in the foreground to which the terminal 200 is switched from the background.

The execution of the application in the foreground to which the terminal 200 is switched from the background may be classified depending on the type of standby mode as mentioned earlier.

As one example, in a case where the terminal screen is locked, as the application is switched to the foreground, a pop-up window for contacting the stamper 100 may be displayed on the screen of the terminal 200.

Displaying the pop-up window is to prevent execution of applications other than the application related to the stamp saving in the locked state of the terminal screen.

As another example, in a case where the terminal screen is a home screen, as the application is switched to the foreground, an execution screen of the application may be directly displayed on the screen of the terminal 200.

In the end, when the terminal 200 is switched from the standby mode to the active mode, if the bit value of the tact bit included in the beacon signal again received after the point of time of switching to the active mode is '1,' the terminal 200 recognizes that the stamper 100 contacts the screen so as to achieve the substantial stamp saving.

The server 300 performs the function to save stamps.

In more detail, upon receiving the store identification information and authentication information, along with a stamp saving request, from the terminal 200, the server 300 performs an authentication procedure required for stamp saving and then saves stamps related to the store for a user.

At this time, the server 300 can perform the authentication procedure by checking the store in which the stamp saving is achieved, based on the store identification information, and checking whether or not the authentication information delivered along with the store identification information matches authentication information issued in the store.

To this end, the server 300 separately manages authentication information generated in the store every time zone. Thus, upon receiving the authentication information from the terminal 200, the server 300 can check whether or not the received authentication information matches the separately managed authentication information.

In saving the stamps, the server 300 may additionally receive user identification information from the terminal 200, in addition to the above-mentioned store identification information and authentication information. Upon receiving the user identification information, the server 300 identifies a user for which stamp saving is requested, based on the received user identification information, and then performs stamp saving related to the store for the identified user.

Here, a result of the stamp saving performed in the server 300 is returned from the server 300 to the terminal 200 in which the result of the stamp saving can be displayed on the screen of the terminal 200.

The current situations of stamp saving for each user performed in the server 300 may be integrated and managed for each store. In this case, it is to be understood that each store can inquire and check the current situations of stamp saving for each user being managed in the store from the server 300.

Hereinafter, the configuration of the stamper 100 according to one embodiment of the present invention will be described in more detail with reference to FIG. 3.

Figure 3:
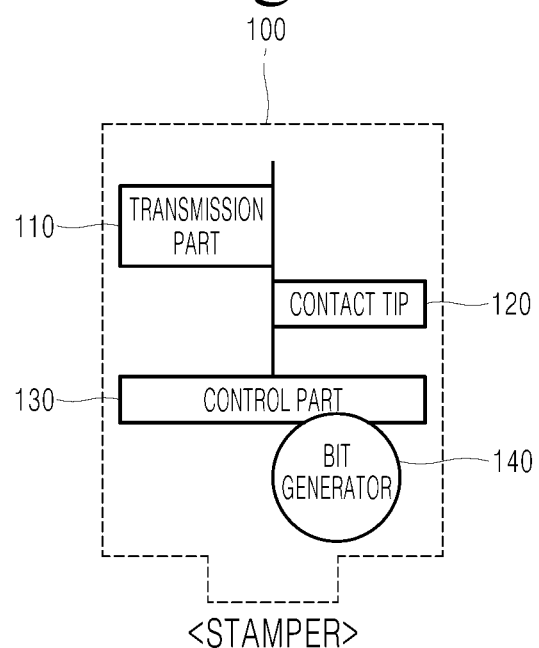
FIG. 3 is a schematic view illustrating the configuration of a stamper according to one embodiment of the present invention.

FIG. 3 is a schematic view illustrating the configuration of the stamper 100 according to one embodiment of the present invention.

Referring to FIG. 3, the stamper 100 according to one embodiment of the present invention includes a transmission part 110 which transmits a beacon signal to the terminal 200, a contact tip 120 for inputting a stamp to the terminal 200 in contact with the screen of the terminal 200, and a control part 130 for achieving stamp contact in the terminal 200.

In addition, the stamper 100 may further include a bit generator 140 which plays a role of a tact switch to be switched from an Off state to an On state by the contact tip 120 when the contact tip 120 contacts the screen of the terminal 200.

The transmission part 110 is provided to irradiate the beacon signal. For example, the transmission part 110 may be a chip antenna capable of irradiating the beacon signal using a BLE (Bluetooth Low Energy) method.

The beacon signal irradiated from the transmission part 110 has a directional beam pattern in which an irradiation angle of the beacon signal is limited to be smaller than a preset irradiation angle.

In order that the beacon signal irradiated from the transmission part 110 has the directional beam pattern, the stamper 100 may further include an irradiation structure 160 to limit the irradiation angle of the beacon signal, as shown in FIG. 4, in addition to the above-described configuration.

The irradiation structure 160 is a shielding structure with its one side opened and is formed to surround the transmission part 110. The beacon signal irradiated from the transmission part 110 is reflected in the inside of the shielding structure. Therefore, the beacon signal irradiated from the transmission part 110 can be transmitted to the terminal 200 through the opened one side of the irradiation structure 160 at a preset irradiation angle.

For reference, some of the beacon signal which is not reflected by the irradiation structure 160 may direct toward the opened one side of the irradiation structure 160 without being reflected by the irradiation structure 160, and the other of the beacon signal flows into a ground.

In the end, the beacon signal irradiated from the transmission part 110 can have the directional beam pattern through the irradiation structure 160 with its one side opened and the irradiation angle of the beacon signal can be greatly limited as compared to that of the existing beacon signal having a non-directional beam pattern.

The stamper 100 including the above-described transmission part 110, contact tip 120 and the control part 130 may be entirely or at least partially implemented in the form of hardware or software modules or in combination thereof.

Ultimately, the stamper 100 according to one embodiment of the present invention can achieve stamp saving through the above configurations. Hereinafter, each of the configurations of the stamper 100 will be described in more detail.

The transmission part 110 performs the function to transmit the store identification information and authentication information to the terminal 200.

In more detail, the transmission part 110 transmits the store identification information and authentication information to the terminal 200 located in the store.

At this time, as described above, the transmission part 110 uses the beacon signal irradiated using the BLE (Bluetooth Low Energy) method to transmit the store identification information and authentication information to the terminal 200.

Here, the beacon signal has the directional beam pattern in which the irradiation angle of the beacon signal is limited to be smaller than the preset irradiation angle by the irradiation structure 160. This is to minimize a possibility that the beacon signal may be received in terminals other than the terminal 200 in which the stamp saving is actually performed, by limiting the irradiation angle of the beacon signal.

On the one hand, as described above, in addition to the store identification information, the authentication information is also contained in the beacon signal irradiated from the transmission part 110. The authentication information may be, e.g., OTP (One Time Password) which can be autonomously generated in the stamper 100 for each time zone.

The reason why the authentication information is transmitted together is to perform an additional authentication procedure in the server 300 based on the authentication information in preparation to receiving the beacon signal in terminals other than the terminal 200 in which the stamp saving is actually to be performed.

The control part 130 performs the function to achieve the stamp saving in the terminal 200.

In more detail, when a stamp is input to the terminal 200, the control part 130 achieves the stamp saving in the terminal 200 by setting a tact bit value on the beacon signal being received in the terminal 200.

Here, the stamp may be input using an electrostatic touch method supported by the terminal 200 when the contact tip 120 is in contact with the screen of the terminal 200 which is receiving the beacon signal.

The control part 130 achieves the stamp saving in the terminal 200 only when the contact tip 120 is in contact with the screen of the terminal 200 but does not achieve the stamp saving when a finger or other tool is in contact with the screen of the terminal 200.

To this end, the control part 130 utilizes the tact bit designated in association with the stamp saving, among the entire bits of the beacon signal.

Here, the tact bit may be set to, e.g., a default value, '0,' in a state where the contact tip 120 is in no contact with the screen of the terminal 200, that is, at ordinary times.

In this connection, when it is recognized that the contact tip 120 is in contact with the screen of the terminal 200, the control part 130 changes the tact bit value, '0,' to '1.' Accordingly, upon receiving the beacon signal with the tact bit value, '1,' the terminal 200 transmits the store identification information and authentication information included in the beacon signal to the server 300.

On the other hand, in a state where the contact tip 120 is in no contact with the screen of the terminal 200, the terminal 200 receives the beacon signal with the tact bit value, '0.' When the tact bit value is set to '0,' no operation related to the stamp saving is performed.

In this way, the tact bit designated in the beacon signal is set to '1' only when the contact tip 120 is in contact with the screen of the terminal 200. Therefore, if a finger or other tool rather than the contact tip 120 is in contact with the screen of the terminal 200, as the tact bit is set to '0,' no operation related to the stamp saving is performed in the terminal 200.

The control part 130 recognizes the contact of the contact tip 120 with the screen of the terminal 200 through the bit generator 140 by which the contact tip 120 is switched between an Off state and an On state in association with the contact with the screen of the terminal 200. To this end, a hardware structure of the stamper 100 is as shown in FIG. 5.

Figure 5:
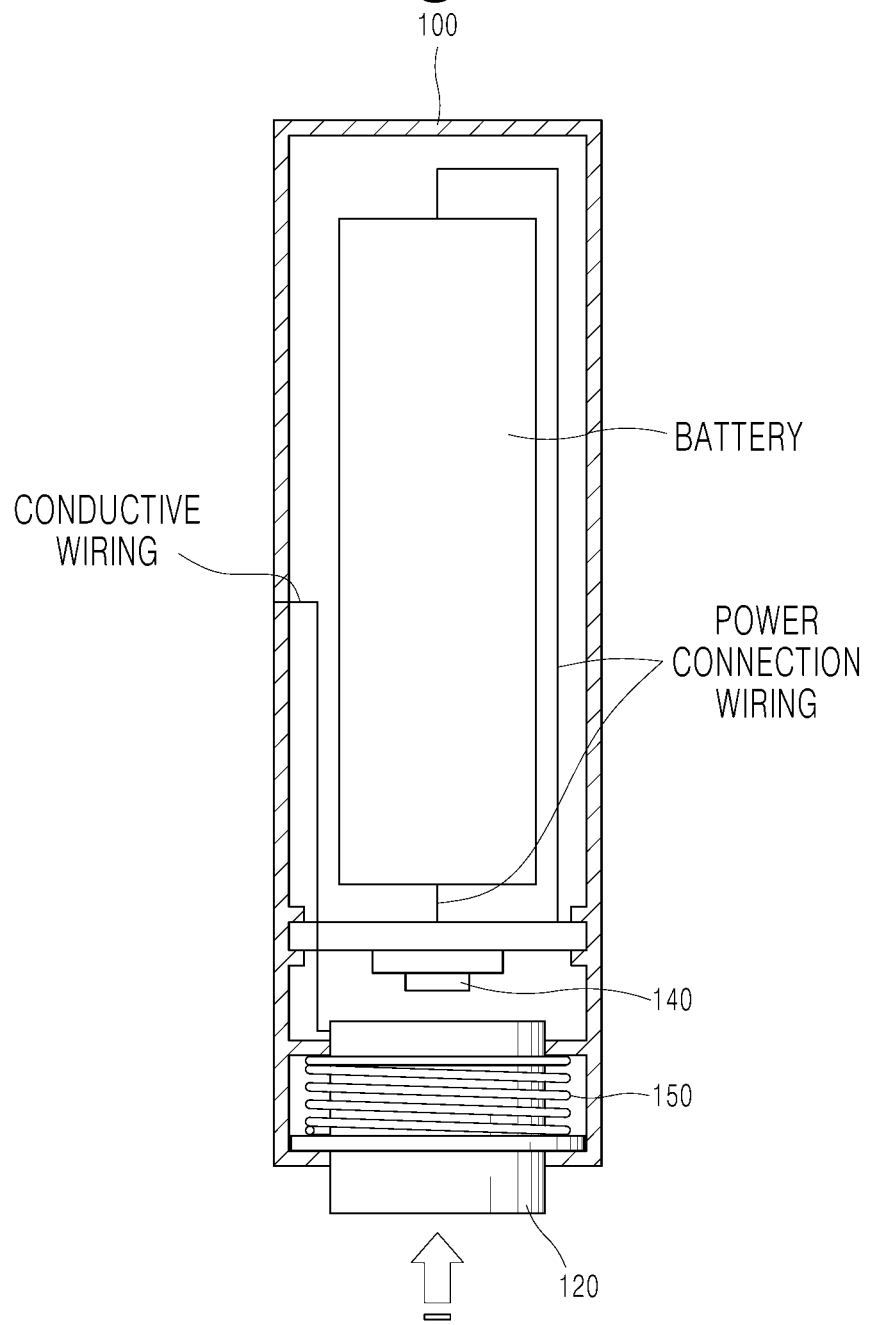

Referring to FIG. 5, the stamper 100 has a hardware structure including a contact tip 120 located to have a shape partially protruding outward from the stamper 100 for contact with the screen of the terminal 200, a bit generator 140 located in the stamper 100 in the opposite direction to the surface of the protrusion of the contact tip 120 in contact with the screen of the terminal 200, and an elastic member 150 located in the stamper 100 to surround the remaining portion except the protruding portion of the contact tip 120.

Here, the elastic member 150 may be, e.g., a spring. However, the elastic member 150 is not limited thereto but may include any members as long as they can be located in the stamper 100 to provide elasticity to the contact tip 120.

For reference, in addition to the above-mentioned elements, the hardware structure of the stamper 100 may further include a PCB board on which a Bluetooth chip, MCU and so on are mounted, a battery 160 to supply operation power to the stamper 100, a power connection wiring connecting the battery 160 and the bit generator 140, and a conduction wiring connecting the contact tip 120 and a housing of the stamper 100 in order to implement an electrostatic touch method using the contact tip 120.

With this hardware structure, when the contact tip 120 is in contact with the screen of the terminal 200, the contact tip 120 is inserted in the stamper 100 in the opposite direction to the screen of the terminal 200 in contact with the contact tip 120 via the elastic member 150. Thus, under a state where the absolute position of the contact tip 120 is fixed, as a body of the stamper 100 is moved toward the screen of the terminal 200, a relative displacement occurs.

At this time, the contact tip 120 inserted in the stamper 100 contacts the bit generator 140, thereby switching the bit generator 140 from the Off state to the On state.

When the contact of the contact tip 120 with the screen of the terminal 200 is released, the contact tip 120 returns to the outside of the stamper 100 by the elasticity of the elastic member 150. When the contact tip 120 returns to the outside of the stamper 100, the contact between the contact tip 120 and the bit generator 140 is released, thereby switching the bit generator 140 from the On state to the Off state.

Hereinafter, the configuration of the terminal 200 according to one embodiment of the present invention will be described in more detail with reference to FIG. 6.

Figure 6:
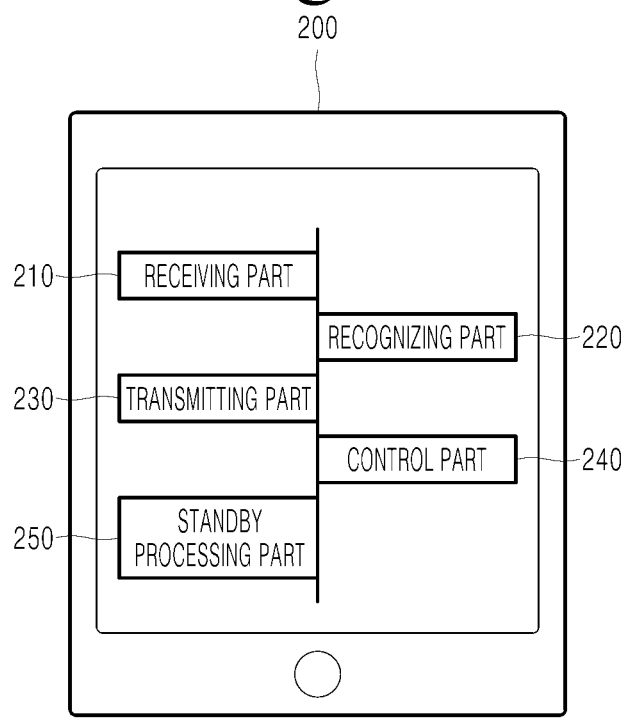
FIG. 6 is a schematic view illustrating the configuration of a terminal according to one embodiment of the present invention.

FIG. 6 is a schematic view illustrating the configuration of the terminal 200 according to one embodiment of the present invention.

Referring to FIG. 6, the terminal 200 according to one embodiment of the present invention includes a receiving part 210 which receives the beacon signal containing the store identification information and authentication information from the stamper 100, a recognizing part 220 which recognizes a stamp input from the stamper 100, a transmitting part 230 which transmits the store identification information and authentication information to the server 300, and a control part 240 which transmits the store identification information and authentication information to achieve the stamp saving.

In addition to the above-mentioned elements, the terminal 200 according to one embodiment of the present invention may further include a standby processing part 250 which processes a series of operations associated with the stamp saving when the terminal 200 enters the standby mode.

The terminal 200 including the above-described receiving part 210, recognizing part 220, transmitting part 230, control part 240 and standby processing part 250 may be entirely or at least partially implemented in the form of hardware or software modules executed by an application related to the stamp service, or in combination thereof.

Ultimately, the terminal 200 according to one embodiment of the present invention can achieve the stamp saving through the above configurations. Hereinafter, each of the configurations of the terminal 200 will be described in more detail.

The receiving part 210 performs the function to receive the beacon signal.

In more detail, the receiving part 210 receives the store identification information and authentication information transmitted using the beacon signal from the stamper 100 in the store.

At this time, the receiving part 210 receives the beacon signal irradiated from the stamper 100 using the BLE (Bluetooth Low Energy) method.

Since the beacon signal irradiated from the stamper 100 has a directional beam pattern in which an irradiation angle of the beacon signal is greatly limited, the beacon signal irradiated from the stamper 100 can be received only in a limited range.

Such receiving the beacon signal irradiated from the stamper 100 only in the limited range is to minimize a possibility that the beacon signal may be received in other terminals in which stamp saving is not substantially performed.

The recognizing part 220 performs the function to recognize a stamp input from the stamper 100.

In more detail, when the contact tip 120 of the stamper 100 contacts the screen, the recognizing part 220 recognizes that the stamp is input from the stamper 100 through the electrostatic touch method.

Here, the stamp input recognized by the recognizing part 220 may be one by the contact tip 120 included in the stamper 100 or one by a finger or other tool.

The control part 240 performs the function to achieve the stamp saving.

In more detail, only when it is confirmed that the contact tip 120 included in the stamper 100 is in contact with the screen, the control part 240 controls the transmitting part 230 to transmit the store identification information and authentication information included in the beacon signal to the server 300 in which the stamp saving related to a store for a user is achieved.

Here, the contact of the contact tip 120 included in the stamper 100 with the screen can be confirmed by a bit value of a tact bit designated in the beacon signal. The tact bit is set to '0' in a state where the contact tip 120 of the stamper 100 is in no contact with the screen of the terminal 200, while being set to '1' in a state where the contact tip 120 is in contact with the screen of the terminal 200.

Thus, when it is confirmed that the bit value of the tact bit in the beacon signal received in the receiving part 210 is '1,' the control part 240 confirms that the stamp recognized by the recognizing part 220 is input by the contact tip 120 included in the stamper 100, and controls the transmitting part 230 to transmit the store identification information and authentication information included in the beacon signal to the server 300 in which the stamp saving related to a store for a user is achieved.

If it is confirmed that the bit value of the tact bit in the beacon signal received in the receiving part 210 is '0,' the control part 240 assumes that the stamp recognized by the recognizing part 220 is input not by the contact tip 120 included in the stamper 100 but by a finger or other tools, and accordingly performs no operation related to the stamp saving.

For reference, prior to achieving the stamp saving, the control part 240 may perform a predetermined authentication process which is performed, e.g., in a way of checking whether or not identification information of a saving card being executed in an application matches the store identification information received from the stamper 100.

The standby processing part 250 performs the function to achieve the stamp saving in a state where the terminal 200 enters the standby mode.

In more detail, the standby processing part 250 receives the beacon signal from the stamper 100 even in the state where the terminal 200 enters the standby mode. At this time, when it is confirmed that the bit value of the tact bit included in the received beacon signal is '1,' the standby processing part 250 recognizes that the stamper 100 is in contact with the screen, and switches the current standby mode to the active mode in which the stamp saving can be achieved.

When connection of the stamper 100 is confirmed from the beacon signal received in the standby mode, the standby processing part 250 switches the standby mode to the active mode. Then, the control part 240 confirms that the bit value of the tact bit in the beacon signal again received through the receiving part 210 after the point of time of switching to the active mode is '1,' and achieves the substantial stamp saving.

As described above, according to the stamp service system according to one embodiment of the present invention, in performing the stamp saving by utilizing an electronic stamp and an application installed in the terminal, by achieving the stamp saving by only the stamp contact on the terminal screen, it is possible to prevent a malfunction of saving stamps by contact by a finger or other tool. In addition, by limiting an irradiation angle of the beacon signal irradiated from the stamper 100, it is possible to prevent malicious and illegal use of stamps by preventing the beacon signal from being received in terminals other than the terminal 200 in which the stamp saving is performed.

Hereinafter, a stamp service method according to one embodiment of the present invention will be described with reference to FIGS. 7 to 10.

For the convenience of description, the elements shown in FIGS. 1 to 6 will be described by referring to the corresponding reference numerals.

Figure 7:
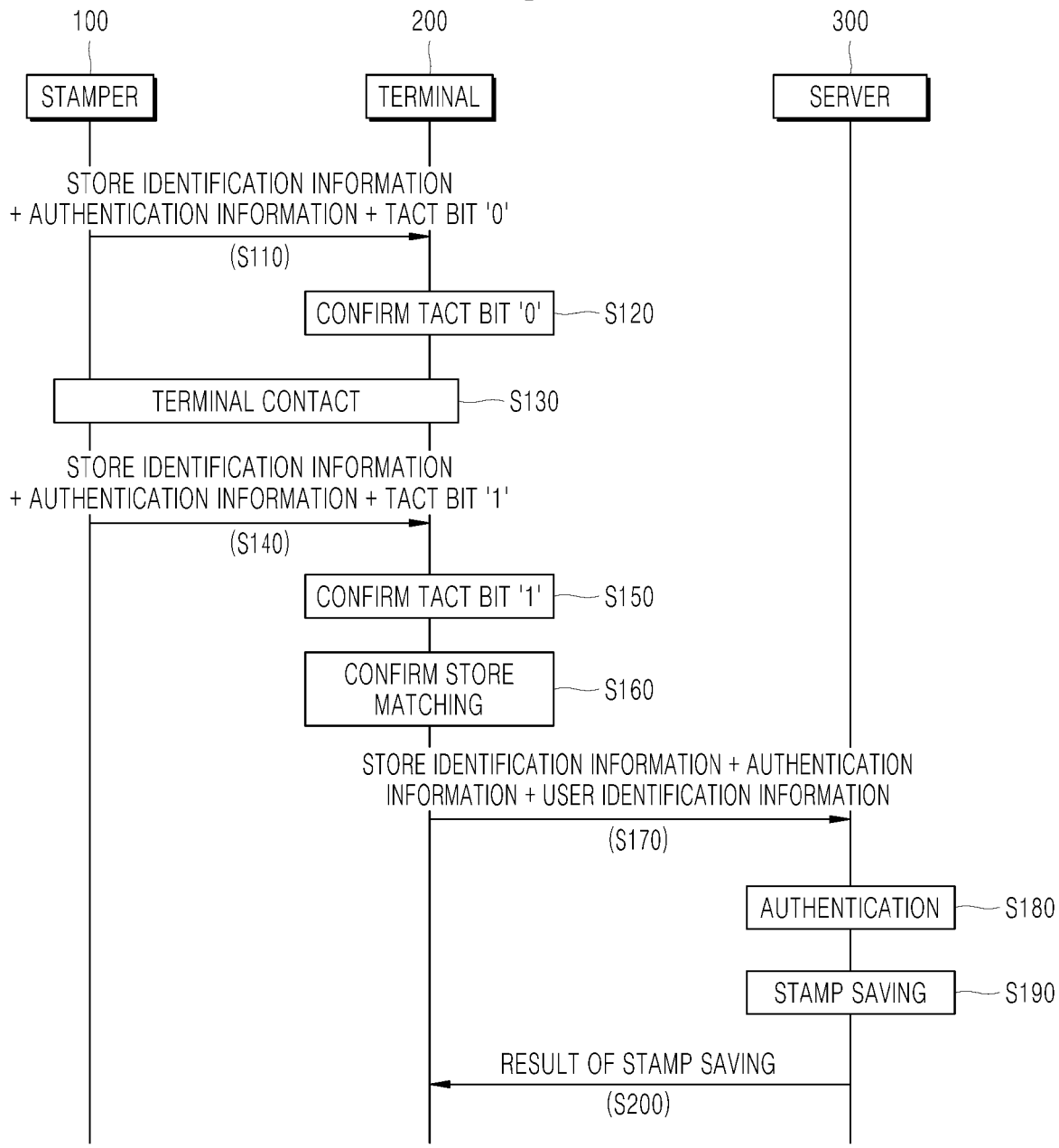
FIG. 7 is a schematic sequence diagram for explaining a flow of operation in the stamp service system according to one embodiment of the present invention.

FIG. 7 is a schematic sequence for explaining a flow of operation in the stamp service system according to one embodiment of the present invention.

Referring to FIG. 7, first, the stamper 100 uses a beacon signal aimed at a terminal 200 located in a store to transmit store identification information and authentication information to the terminal 200 (S110).

At this time, since the contact tip 120 is in no contact with the screen of the terminal 200, the stamper 100 sets the bit value of the tact bit designated in the beacon signal to '0.' No operation related to the stamp saving is performed in the terminal 200 which received the beacon signal with the bit value of the tact bit set to '0.'

The stamper 100 enters a sleep mode with lapse of a certain period of time after being powered on. Therefore, in order to transmit the beacon signal, the stamper 100 in the sleep mode has to be switched to a wake-up mode.

In the end, upon initially contacting the screen of the terminal 200 in the sleep mode, the stamper 100 is switched to the wake-up mode to transmit the beacon signal.

Even when the stamper 100 is switched from the sleep mode to the wake-up mode, since the contact tip 120 remains in contact with the screen of the terminal 200, the bit value of the tact bit designated in the beacon signal is set to '1' for transmission.

At this time, a series of operations related to the stamp saving is performed in terminal 200 which received the beacon signal with the bit value of the tact bit set to '1.' This is subject to the conditions that the terminal 200 have received the beacon signal in the active mode.

If a point of time at which the stamper 100 transmits the beacon signal with the bit value of the tact bit set to '1' after the stamper 100 is switched from the sleep mode to the wake-up mode is in the standby mode of the terminal 200, the terminal 200 is only switched from the standby mode to the active mode. For the substantial stamp saving, the beacon signal with the bit value of the tact bit set to '1' has to be once again received from the stamper 100 after a point of time at which the terminal 200 is switched from the standby mode to the active mode.

Further, the store identification information and authentication information transmitted using the beacon signal from the stamper 100 in the store is received in the terminal 200. At this time, since the bit value of the tact bit designated in the beacon signal is set to '0,' no operation related to the stamp saving is performed (S120).

Then, even when the contact tip 120 is in contact with the screen of the terminal 200, likewise, the stamper 100 uses the beacon signal to transmit the store identification information and authentication information to the terminal 200 (S130 and S140).

At this time, since the contact tip 120 remains in contact with the screen of the terminal 200, the stamper 100 sets the bit value of the tact bit designated in the beacon signal to '1.' Thus, a series of operations related to the stamp saving is performed in the terminal 200 which received the beacon signal with the bit value of the tact bit set to '1,'

In this connection, when it is confirmed that the bit value of the tact bit in the beacon signal received from the stamper 100 is '1,' the terminal 200 confirms that the contact tip 120 of the stamper 100 is in contact with the screen, in which case the store identification information and authentication information included in the beacon signal is transmitted to the server 300 to achieve the stamp saving related to the store for the user (S150 to S170).

At this time, after checking whether or not identification information of a saving card being executed in an application matches the store identification information received from the stamper 100, only when it is checked that both match with each other, the terminal 200 transmits the store identification information and authentication information to the server 300.

Here, when the terminal 200 additionally transmits user identification information, the server 300 receives the user identification information, identifies a user requiring stamp saving, and performs stamp saving for a store of the identified user.

Further, upon receiving the store identification information and authentication information, along with a stamp saving request, from the terminal 200, the server 300 performs an authentication procedure required for stamp saving (S180).

At this time, the server 300 can perform the authentication procedure by checking the store in which the stamp saving is achieved, based on the store identification information, and checking whether or not the authentication information delivered along with the store identification information matches authentication information issued in the store.

Thereafter, the server 300 performs the stamp saving for the store of the user (S190 and S200).

At this time, the server 300 can identify the user requiring the stamp saving, perform the stamp saving for the store of the identified user, and return a result of the performed stamp saving to the terminal 200 which can then display the result of the stamping saving.

Here, in performing the stamp saving, the server 300 may additionally receive user identification information from the terminal 200, in addition to the above-mentioned store identification information and authentication information. Upon receiving the user identification information, the server 300 identifies a user for which stamp saving is requested, based on the user identification information, performs stamp saving for the store of the identified the user, and returns a result of the stamp saving to the terminal 200 which then displays the result of the stamp saving.

Figure 8:
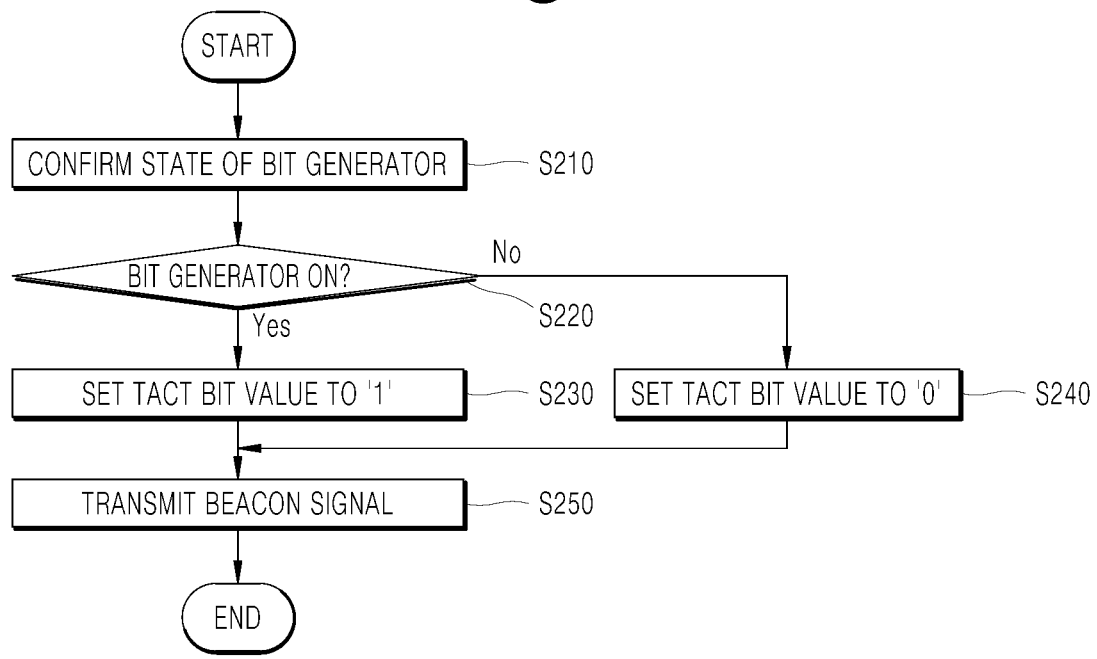
FIG. 8 is a flow chart for explaining a flow of operation in the stamper according to one embodiment of the present invention.

Hereinafter, a flow of operation in the stamper 100 according to one embodiment of the present invention will be described in detail with reference to FIG. 8.

First, when the bit generator 140 is switched from an Off state to an On state by contact between the contact tip 120 and the screen of the terminal 200, the control part 130 sets the bit value of the tact bit designated in the beacon signal to '1,' and a series of operations related to the stamp saving can be performed in the terminal 200 which received the beacon signal with the bit value of the tact bit set to '1' (S210 to S230).

On the other hand, when the bit generator 140 remains in the Off state by noncontact between the contact tip 120 and the screen of the terminal 200, the control part 130 sets the bit value of the tact bit designated in the beacon signal to '0,' and then transmits the beacon signal with the bit value of the tact bit set to '0' to the terminal 200 through the transmitting part 110 (S210, 5220 and S240).

Here, no operation related to the stamp saving is performed in the terminal 200 which received the beacon signal with the bit value of the tact bit set to '0.'

Then, when the setting of the tact bit value is completed, the control part 130 controls the transmitting part 110 to transmit the beacon signal including the store identification information and authentication information to the terminal 200 (S250).

At this time, to minimize a possibility that the beacon signal may be received in terminals other than the terminal 200 in which stamp saving is substantially performed, the transmitting part 110 transmits the beacon signal whose irradiation angle is limited to have a directional beam pattern.

Here, the beacon signal transmitted to the terminal 200 includes the bit value of the tact bit as described above. In this connection, the terminal 200 which received the beacon signal with the bit value of the tact bit set to '1' transmits the store identification information and authentication information included in the beacon signal to the server 300 in which the stamp saving is achieved.

On the other hand, no operation related to the stamp saving is performed in the terminal 200 which received the beacon signal with the bit value of the tact bit set to '0.'

For reference, an example of the flow of operation performed in the stamper 100 will be described below with reference to FIG. 9.

Figure 9A:
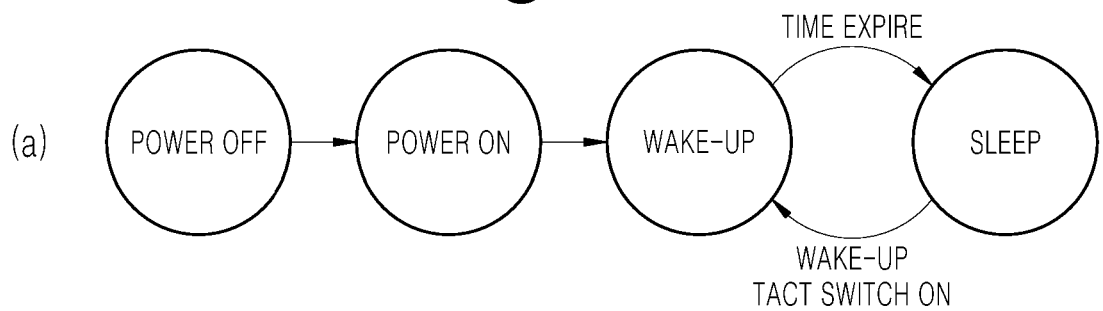
FIGS. 9A, 9B and 9C are schematic sequence diagrams for explaining a flow of operation in the stamper according to one embodiment of the present invention.

First, as shown in FIG. 9A, the stamper 100 enters a wake-up mode automatically when being powered on. At this time, the beacon signal is transmitted with the bit value of the tact bit set to '0' according to the Off state of the bit generator 140. After lapse of a certain period of time from the Off state of the bit generator 140, the stamper 100 enters a sleep mode to stop the transmission of the beacon signal, thereby minimizing power consumption.

At this time, the stamper 100 can be automatically powered on immediately after a battery is inserted in the stamper 100.

Figure 9B:
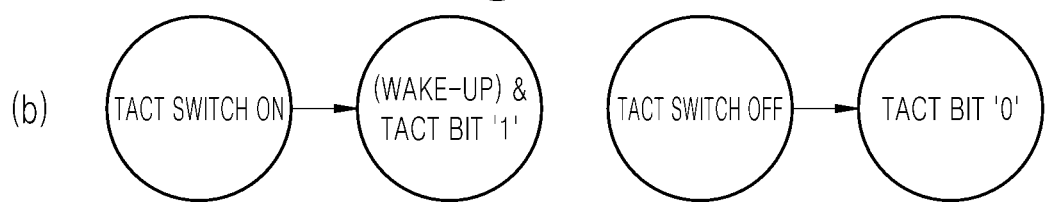

Next, as shown in FIG. 9B, in the sleep mode of the stamper 100, when the contact tip 120 contacts the screen of the terminal 200, the electrostatic touch for the terminal 200 is made and, at the same time, the bit generator 140 is switched to an On state. Accordingly, at the same time of entering the wake-up mode, the stamper 100 transmits the beacon signal with the bit value of the tact bit set to '1' to the terminal 200 to allow the terminal 200 to recognize that the contact by the contact tip 120 is made. Thereafter, at the moment that the contact tip is detached from the screen of the terminal 200, the bit generator 140 is switched to the Off state and the bit value of the tact bit is changed to '0.'

Figure 9C:
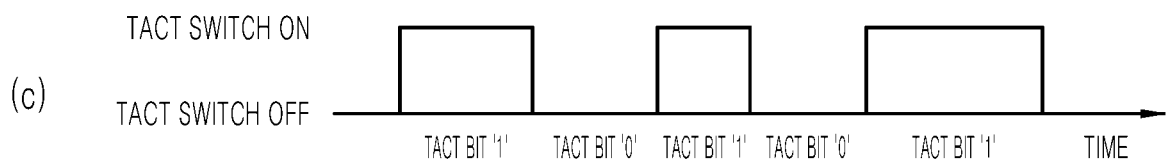

In the meantime, as shown in FIG. 9C, there may occur a difference in hold time of contact between the contact tip 120 and the screen of the terminal 200 depending on a pattern of use of the stamper 100. However, the terminal 200 can know contact/noncontact and the number of times of contact of the stamper 100 by recognizing a change in tact bit value irrespective of the contact hold time.

Figure 10:
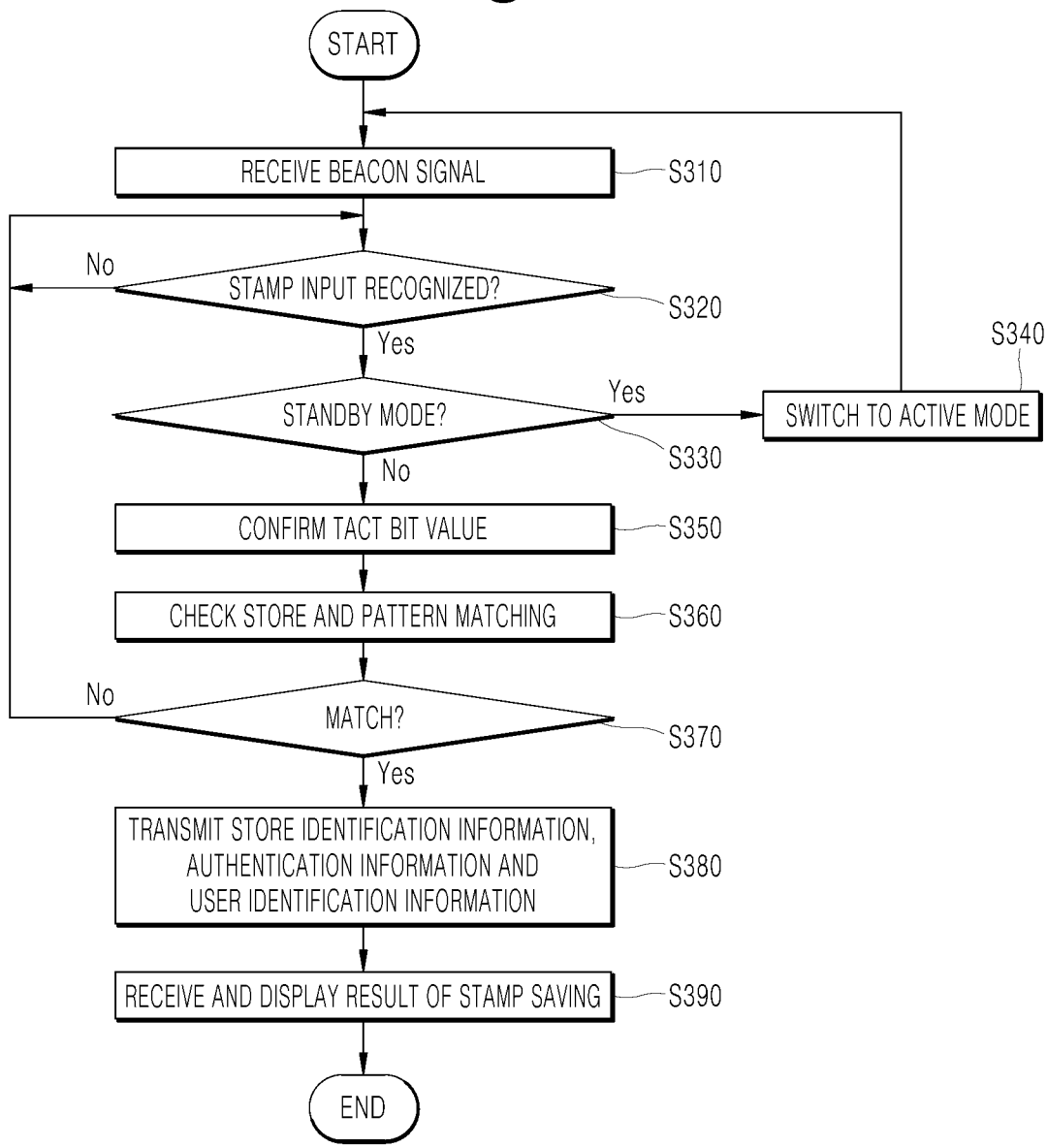
FIG. 10 is a flow chart for explaining a flow of operation in the terminal according to one embodiment of the present invention.

Hereinafter, a flow of operation in the terminal 200 according to one embodiment of the present invention will be described in detail with reference to FIG. 10.

First, the receiving part 210 receives the store identification information and authentication information transmitted using the beacon signal from the stamper 100 in the store (S310).

At this time, the receiving part 210 receives the beacon signal irradiated from the stamper 100 using the BLE (Bluetooth Low Energy) method. Since the beacon signal irradiated from the stamper 100 has a directional beam pattern in which an irradiation angle of the beacon signal is greatly limited, the beacon signal irradiated from the stamper 100 can be received only in a limited range.

Then, when the contact tip 120 included in the stamper 100 contacts the screen, the recognizing part 220 recognizes that a stamp is input from the stamper 100 by an electrostatic touch method (S320).

Here, the stamp input recognized by the recognizing part 220 may be one by the contact tip 120 included in the stamper 100 or one by a finger or other tool.

In the meantime, when a point of time at which the contact tip 120 included in the stamper 100 contacts the screen is at a state where the terminal 200 enters the standby mode, the standby processing part 250 switches the current standby mode to the active mode in which the stamp saving can be achieved (S330 and S340).

At this time, in the state where the terminal 200 enters the standby mode, when it is confirmed that the bit value of the tact bit of the beacon signal received from the stamper 100 is '1,' the standby processing part 250 recognizes that the stamper 100 has contacted the screen, and switches the current standby mode to the active mode in which the stamp saving can be achieved.

In the end, by switching the standby mode to the active mode, the standby processing part 250 causes the control part 240 to confirm that the bit value of the tact bit in the beacon signal again received through the receiving part 210 after the point of time of switching to the active mode is '1' so as to achieve the substantial stamp saving.

Then, the control part 240 checks whether or not the stamp recognized by the recognizing part 220 is one by contact of the contact tip 120 included in the stamper 100 (S360 and S370).

At this time, when it is confirmed that the bit value of the tact bit in the beacon signal received in the receiving part 210 is '1,' the control part 240 confirms that the stamp recognized by the recognizing part 220 is one input by the contact tip 120 included in the stamper 100.

On the other hand, when it is confirmed that the bit value of the tact bit in the beacon signal received in the receiving part 210 is '0,' the control part 240 assumes that the stamp recognized by the recognizing part 220 is one input not by the contact tip 120 included in the stamper 100 but by a finger or other tool.

Further, when it is checked that the stamp recognized by the recognizing part 220 is one input by the contact tip 120 included in the stamper 100, the control part 240 controls the transmitting part 230 to transmit the store identification information and authentication information included in the beacon signal to the server 300 in which the stamp saving related to a store for a user is achieved (S380 to S400).

At this time, prior to transmitting the store identification information and authentication information to the server 300, the control part 240 checks whether or not the identification information of a saving card being executed in an application matches the store identification information received from the stamper 100, and transmits the store identification information and authentication information included in the beacon signal to the server 300 only when it is checked that both match with each other.

Here, when the control part 240 additionally transmits user identification information, the server 300 receives the user identification information, identifies a user requiring stamp saving, and performs stamp saving for the store of the identified user.

On the other hand, when the control part 200 assumes that the stamp recognized by the recognizing part 220 is input not by the contact tip 120 included in the stamper 100 but by a finger or other tools, no operation related to the stamp saving is performed.

Thereafter, upon receiving a result of the stamp saving from the server 300, the control part 240 displays the result of the stamp saving on an application execution screen.

As described above, according to the stamp service system according to one embodiment of the present invention, in performing the stamp saving by utilizing an electronic stamp and an application installed in the terminal, by achieving the stamp saving by only the stamp contact on the terminal screen, it is possible to prevent a malfunction of saving stamps by contact by a finger or other tool. In addition, by limiting an irradiation angle of the beacon signal irradiated from the stamper 100, it is possible to prevent malicious and illegal use of stamps by preventing the beacon signal from being received in terminals other than the terminal 200 in which the stamp saving is performed.

The steps of the method or algorithm described in connection with the embodiments suggested herein may be directly implemented by hardware or may be implemented in the form of program instructions executed through a variety of computing means and recorded in a computer-readable recording medium. The computer-readable recording medium may store program instructions, data files, data structures and so on alone or in combination. The program instructions stored in the medium may be ones specially designed and configured to implement the present invention or ones known in the art of computer software. Examples of the computer-readable recording medium may include magnetic media such as a hard disk, a floppy disk and a magnetic tape, optical media such as CD-ROM and DVD, magneto-optical media such as a floptical disk, and hardware devices specially configured to store and execute program instructions, such as ROM, RAM, flash memory and so on. Examples of the computer programs may include machine language codes created by a compiler and high level language code executed by a computer using an interpreter or the like. The hardware devices may be configured to be operated as one or more software modules to perform the operation of the present invention and vice versa.

While the present invention has been particularly shown and described with reference to exemplary embodiments thereof, it will be understood by those skilled in the art that various changes in form and details may be made therein without departing from the spirit and scope of the present invention as defined by the appended claims and equivalents thereof. Therefore, the disclosed embodiments have to be construed as not limitative but illustrative. The accompanying claims and their equivalents are intended to cover such forms or modifications as would fall within the scope and spirit of the disclosures.

What is claimed is:

1. A stamper comprising:
    a transmission part configured to transmit a beacon signal including store identification information, authentication information and a bit related to stamp saving to a terminal;
    a contact tip configured to contact the terminal screen;
    a bit generator configured to generate the bit to be switched from an Off state to an On state when the contact tip contacts the terminal screen; and
    a control part configured to control for transmission of the beacon signal,
    wherein the control part controls the bit related to stamp saving to have a particular bit value when the contact tip contacts the terminal screen and controls to transmit the particular bit value, the store identification information and the authentication information to the terminal using the beacon signal, thereby the store identification information and authentication information being able to be transmitted to a server for the stamp saving when the bit related to stamp saving is controlled to have the particular bit value.

2. The stamper according to claim 1, wherein the bit generator sets a bit value of the bit related to stamp saving to the particular bit value when the bit generator is switched from an Off state to an On state.

3. The stamper according to claim 2, wherein the bit generator is switched from the Off state to the On state by the contact tip moved to the inside of the stamper and contacted with the bit generator when the contact tip contacts the terminal screen, and
    wherein the bit generator is switched from the On state to the Off state by the contact tip moved to the outside of the stamper and released from the bit generator when the contact of the contact tip with the terminal screen is released.

4. The stamper according to claim 1, further comprising an irradiation structure which is a shielding structure with one side opened and is formed to surround the transmission part in such a manner that the beacon signal irradiated from the transmission part is transmitted to the terminal through the opened one side at a preset irradiation angle.

* * * * *